July 23, 1957

C. C. HANSEN 2,799,920

AUTOMOBILE DOOR TOOL

Filed Sept. 20, 1954

Clayton C. Hansen
INVENTOR.

BY
Attorneys

July 23, 1957  
C. C. HANSEN  
2,799,920  
AUTOMOBILE DOOR TOOL

Filed Sept. 20, 1954

Clayton C. Hansen  
INVENTOR.

BY *Clarence A. O'Brien*  
*and Harvey B. Jacobson*  
Attorneys

July 23, 1957 C. C. HANSEN 2,799,920
AUTOMOBILE DOOR TOOL

Filed Sept. 20, 1954 3 Sheets-Sheet 3

Clayton C. Hansen
INVENTOR.

BY *Clarence A. O'Brien*
*and Harvey B. Jacobson*
Attorneys

United States Patent Office 2,799,920
Patented July 23, 1957

2,799,920

AUTOMOBILE DOOR TOOL

Clayton C. Hansen, Edgerton, Wis.

Application September 20, 1954, Serial No. 456,967

2 Claims. (Cl. 29—288)

This invention relates to the class of tools and more particularly to a novel tool designed for the use of removing automobile doors from automobiles.

The primary object of the present invention resides in the provision of a tool for enabling an individual to easily remove a door from an automobile and to support the door while such repairs or replacements that are necessary are made and which will enable the door to be replaced without further help.

A further object of the invention resides in the provision of a door support tool that is portable and which is mounted on wheels so that it may be moved from one place to another even with the door supported thereon.

The construction of this invention features means for adjustably engaging the upper and lower portions of a door of an automobile in a manner wherein the members engaging the door may be vertically and horizontally adjusted.

Still further objects and features of this invention reside in the provision of an automobile door tool that is strong and durable, simple in construction and operation, highly efficient, and which is comparatively inexpensive to manufacture thereby permitting wide distribution to the automotive trade.

These, together with the various auxiliary objects and features of the invention which will become apparent as the following description proceeds, are attained by this automobile door tool, a preferred embodiment of which has been illustrated in the accompanying drawings, by way of example only wherein.

Figure 1:
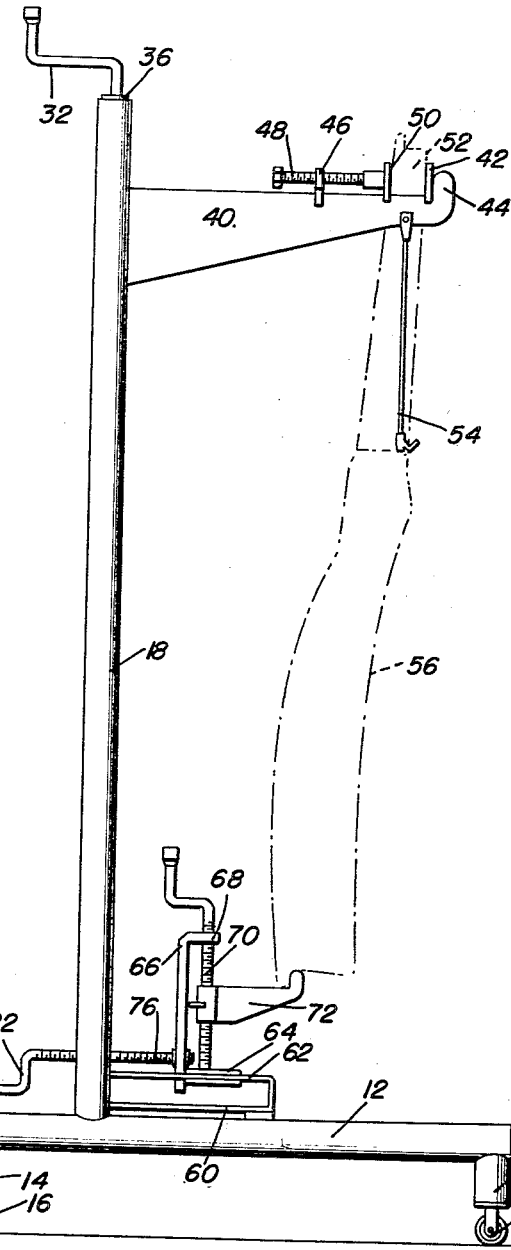
Figure 1 is a front elevational view of the automobile door comprising the present invention.
Figures 2, 3, 7:
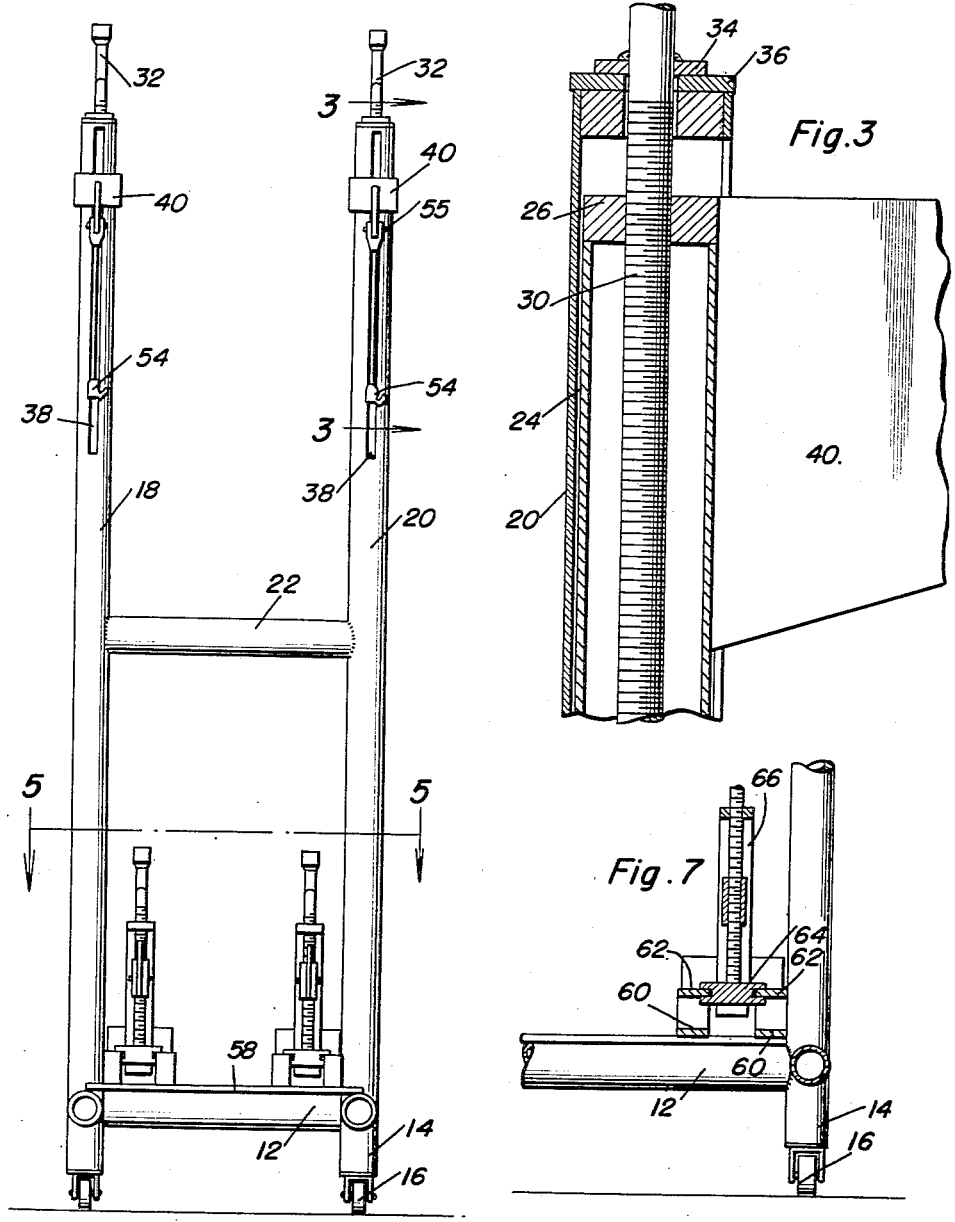
Figure 2 is a side elevational view of the apparatus.
Figure 3 is an enlarged vertical sectional view as taken along the plane of line 3—3 of Figure 2 illustrating the relative relationship between the tubular support members and the tubular guides.
Figure 7 is a sectional detail view as taken along the plane of line 7—7 in Figure 5 illustrating the construction of the means for vertically and horizontally adjusting the lower door supports.
Figure 4:
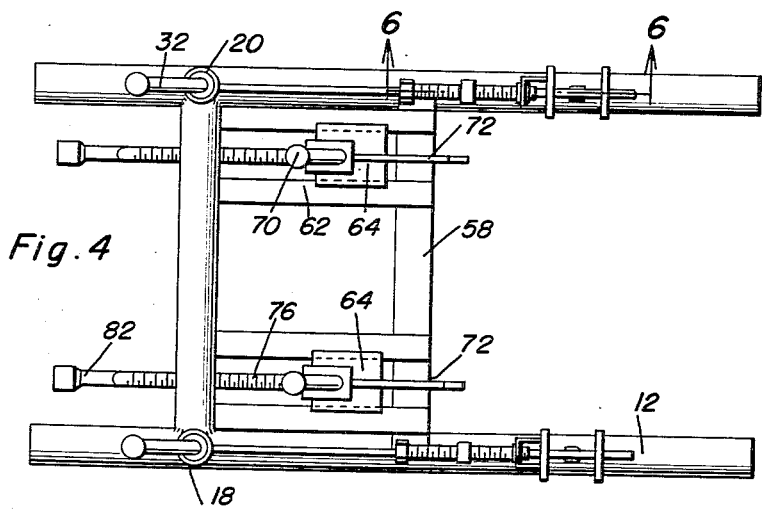
Figure 4 is a top plan view of the automobile door tool.
Figure 5:
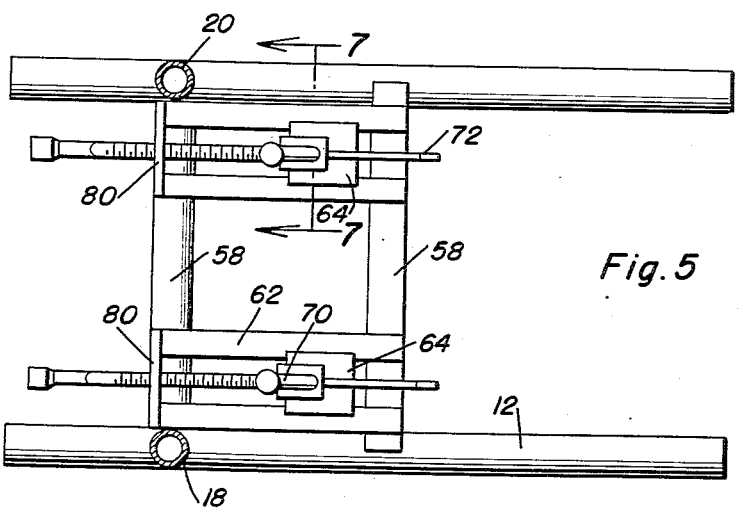
Figure 5 is a horizontal sectional view as taken along the plane of line 5—5 of Figure 2.
Figure 6:
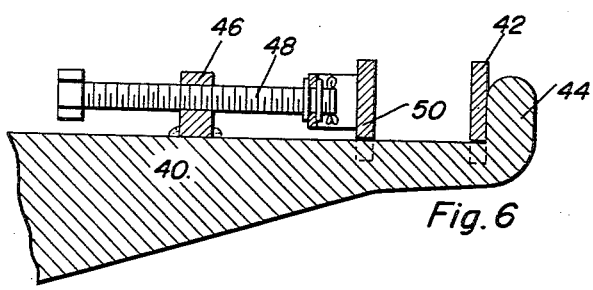
Figure 6 is an enlarged vertical sectional view as taken along the plane of line 6—6 in Figure 4 illustrating the construction of the clamp means carried by the upper support member.

With continuing reference to the accompanying drawings wherein like reference numerals designate similar parts throughout the various views, reference numeral 10 generally designates the automobile door tool comprising the present invention. The automobile door tool 10 includes a substantially rectangular frame 12 formed of tubular sections and having downwardly depending legs 14 to which casters 16 are attached. The legs and casters 16 provide means for insuring proper locomotion of the automobile door tool when desired.

Molded or otherwise secured to and rising from the frame 12 is a pair of tubular supports of identical construction and designated by reference numerals 18 and 20. A brace 22 is provided and extends between the standards 18 and 20.

Slidably received within each of the standards 18 and 20 is a tubular guide 24 which carries a collar 26 internally threaded for reception of externally threaded rods 30. The rods 30 are provided with cranks 32 at the upper ends thereof so that the rods may be readily located and carry collars 34 adapted to seat on the tops 36 which close the ends of the standards 18 and 20. The standards are provided with vertically extending slots 38 therethrough and upper support members 40 are attached to the tubular guides 24 and extend through the slots 38.

Each of the upper support members 40 carry a fixed plate 42 on the outer end thereof and secured to the upwardly extending portion 44 of the upper support members 40. Further, an internally threaded lug 46 is formed on each of the support members 40 for reception of threaded clamp rods 48 which carry movable plates 50 which are urged into engagement with the upper portion as at 52 of an automobile door 56 at the upper portion of the periphery of the window frame of the door 56.

Downwardly extending from the upper support members 40 are hook members 54 which are adapted to engage a suitable portion of the door when it is desired to support a door of a convertible or like vehicle. The hook members 54 are pivotally attached to the upper support members 40 as at 55.

Secured to the framework 12 is a lower bar 58 which carries pairs of lower track supports 60 to which the tracks 62 are attached with the tracks 62 arranged in pairs for reception of substantially H-shaped slides 64 which slidably engage the tracks 62. The slides 64 have fittings 66 of inverted L-shape welded or otherwise attached thereto and riding between the pairs of tracks 62. Threadedly engaged in the upper portion 68 of each of the fittings 66 is a threaded crank 70 upon which there is threadedly secured the lower door supports 72. Rotation of the cranks 70 therefore raise and lower the lower door supports 72. Rotatably mounted and attached to the fitings 66 are horizontally extending threaded members 76 which are threadedly engaged within the plates 80 which extend between the lower track support members 16 and the tracks 62 of each of the pairs of tracks. Hence, rotation of the threaded members 76 by means of the cranks 82 provided therefor will cause the lower door support member 72 to move horizontally.

By engagement of the upper door support members 40 and the lower door support members 72 with the door 56, the door may be easily removed from the vehicle due to the fact that the door will be suitably supported by the framework 12. Then, a single individual can easily remove the door and replace the door after such work as needed has been accomplished.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A door support tool for vehicles comprising a wheeled frame, a pair of tubular standards rising from said frame, said standards having vertically extending slots therein, tubular guides received in said standards and having collars thereon, threaded rods carried by said standards threadedly engaging said collars, upper support members carried by said tubular guides, said upper support members extending through said slots, clamps carried by said support members, crank means secured to said threaded rods at the upper ends thereof for rotating said threaded rods at the upper ends thereof for rotating said threaded rods to raise and lower said tubular guides, pairs of spaced tracks carried by said frame, slides slidably received by said tracks, means for adjusting said slides horizontally, lower door supports, said lower door supports being vertically adjustably carried by said slides, said means for adjusting said slides horizontally including plates extending between said spaced tracks, threaded members threadedly secured in said plates, fittings carried by said slides, said threaded members being rotatably secured to said fittings.

2. A door support tool for vehicles comprising a wheeled frame, a pair of tubular standards rising from said frame, said standards having vertically extending slots therein, tubular guides received in said standards and having collars thereon, threaded rods carried by said standards threadedly engaging said collars, upper support members carried by said tubular guides, said upper support members extending through said slots, clamps carried by said support members, crank means secured to said threaded rods at the upper ends thereof for rotating said threaded rods to raise and lower said tubular guides, lower door supports, pairs of spaced tracks carried by said frame, slides slidably received by said tracks, means for adjusting said slides horizontally, said lower door supports being vertically adjustably carried by said slides, said means for adjusting said slides horizontally including plates extending between said spaced tracks, threaded members threadedly secured in said plates, fittings carried by said slides, said threaded members being rotatably secured to said fittings, vertically extending cranks for vertically adjusting said lower door supports threadedly engaging said fittings and rotatably secured to said slides, said lower door supports being threadedly secured on said cranks.

References Cited in the file of this patent
UNITED STATES PATENTS

| | | |
|---|---|---|
| 289,948 | Williams | Dec. 11, 1883 |
| 1,297,804 | Decatur | Mar. 18, 1919 |
| 2,221,241 | Mallory et al. | Nov. 12, 1940 |
| 2,340,587 | Graham | Feb. 1, 1944 |
| 2,400,862 | Zern | May 21, 1946 |
| 2,567,485 | Schwandt | Nov. 27, 1951 |
| 2,593,738 | Dollahite | Apr. 22, 1952 |